US008527111B2

(12) United States Patent
Hilmersson

(10) Patent No.: US 8,527,111 B2
(45) Date of Patent: Sep. 3, 2013

(54) DEVICE AND A METHOD FOR MOVING A JET MEMBER

(75) Inventor: Ronnie Hilmersson, Holsbybrunn (SE)

(73) Assignee: Aquajet Systems Holding AB, Holsbybrunn (SE)

( * ) Notice: Subject to any disclaimer, the term of this patent is extended or adjusted under 35 U.S.C. 154(b) by 315 days.

(21) Appl. No.: 13/126,083

(22) PCT Filed: Oct. 27, 2008

(86) PCT No.: PCT/SE2008/051216

§ 371 (c)(1), (2), (4) Date: Apr. 26, 2011

(87) PCT Pub. No.: WO2010/050859

PCT Pub. Date: May 6, 2010

(65) Prior Publication Data

US 2011/0204699 A1 Aug. 25, 2011

(51) Int. Cl.
*G06F 19/00* (2011.01)

(52) U.S. Cl.
USPC ................ 700/302; 299/17; 404/75; 239/275

(58) Field of Classification Search
USPC ........... 700/302, 282, 301; 415/173; 404/90, 404/75; 299/17; 239/752; 137/899.1
See application file for complete search history.

(56) References Cited

U.S. PATENT DOCUMENTS 4,055,488 A * 10/1977 Siri et al. ...................... 209/173
4,081,200 A 3/1978 Cheung
4,784,518 A * 11/1988 Cutler ............................ 404/79
4,854,770 A 8/1989 Puchala et al.
5,361,993 A * 11/1994 Andersson .................... 239/752
6,179,519 B1 * 1/2001 Hilmersson ..................... 404/91

FOREIGN PATENT DOCUMENTS

WO 2006/073337 7/2006

* cited by examiner

*Primary Examiner* — Kidest Bahta
(74) *Attorney, Agent, or Firm* — Dilworth & Barrese, LLP.

(57) ABSTRACT

A device for moving a jet member in a first path over a layer to be treated by the jet has means configured to enable input of data relating to a geometrical shape of a surface of said layer to be treated by the jet member and means configured to use said data for calculating end positions (S1, S2) of an impact point of the jet member for a plurality of consecutive stripes (S) extending substantially perpendicularly to a second path for indexing, each having a width substantially corresponding to an indexing step and together forming said geometrical shape. A control arrangement co-ordinates movement of the impact point of the jet member and said indexing for treating a surface of said layer having said geometrical shape by said jet member.

20 Claims, 4 Drawing Sheets

DEVICE AND A METHOD FOR MOVING A JET MEMBER

TECHNICAL FIELD OF THE INVENTION AND PRIOR ART

The present invention relates to a device and a method for moving a jet member having a nozzle according to the preambles of the appended independent device and method claims.

This treatment of the material layer is first of all intended to be a material removing treatment. Although the layer may consist of other material a concrete layer is preferably concerned herein. Primarily, the treatment is intended to have the purpose to remove weakened material from the layer. It may then be a question of removing weakened concrete from concrete layers on roads, bridges and a variety of building structures, whereupon the removed concrete may be replaced by new concrete. It is in this connection especially preferred that the treating member is constituted by a jet member so as to direct a high pressure jet of liquid against the material layer. Thus, it is this high pressure jet of liquid which executes the material removing treatment. Preferably, the high pressure liquid consists of water.

A device of the type defined in the introduction is already known through for instance EP 1 029 127 B1 of the applicant.

By moving the carriage and by that said jet member in said first rectilinear path between two opposite end positions and when moved at least once between these end positions indexing the carriage with jet member as defined in the introduction and repeating this procedure it is possible by means of devices of this type already known to obtain treatment of a continuous surface of said layer having a substantially rectangular shape. However, it is sometimes desired or even required to treat a continuous surface of said layer having another shape than that of a rectangular by a said jet member.

For illuminating but not in any way restricting the scope of the present invention the use of a device of this type for removing weakened material in connection with joints of bridges may be described as an example. Such joints do normally extend obliquely across the extension of the road surface on the bridge. These joints may for instance make an angle of approximately 60° with said extension. When weakened material is to be removed for repairing the road surface layer in connection with such a joint material has to be removed over a surface extending along the joint and on both sides thereof, which in fact means a surface with a shape similar to a parallelogram with first sides extending in the direction of the road and second sides extending substantially in parallel with said joint.

There are several options to obtain treatment of such a surface to be treated by means of known devices of this type, but problems are adhered to all of them.

One way to proceed is to direct the device so that indexing is carried out in the longitudinal direction of the bridge and removing weakened material from the road surface according to a rectangle enclosing said parallelogram. However, this means that considerably more material than needed is removed, which makes the repair rather costly.

Another way to proceed is to carry out indexing in the longitudinal direction of the bridge but removing material through the operation of the device from a rectangular road surface layer only partially covering said parallelogram and after that using water jet hand tools for removing material for parts of said parallelogram, as opposite acute corners thereof. Such a procedure is time consuming and by that costly.

A further way of proceeding when using devices of this type already known is to change the direction of said indexing several times while directing the indexing directions obliquely with respect to the extension of the bridge and possibly combine this with the use of said hand tools or erecting special structures on and/or outside the bridge for obtaining treatment of road surface regions belonging to said parallelogram to be treated.

Which one of these procedures being preferred in a particular situation depends upon the conditions of said situation, but it will mostly result in considerably higher costs than would said joint have an extension being substantially perpendicular to the extension of the bridge.

It is pointed out that the same problems arise when a surface layer of another shape than a rectangle is to be treated by a jet in another way than for removing material from said layer, and also when material is to be removed over surface layers with any other shape than a rectangle, not only with a shape of a parallelogram.

SUMMARY OF THE INVENTION

The object of the present invention is to provide a device and a method of the type defined in the introduction reducing said problems described above of such devices already known.

This object is according to the invention obtained by providing a device according to the introduction with means configured to enable input of data relating to the geometrical shape of a surface of said layer to be treated by the jet member, and means configured to use said data for calculating end positions of said impact point of the jet member for a plurality of consecutive stripes extending substantially perpendicularly to said second path for indexing, each having a width substantially corresponding to said indexing step and together forming said geometrical shape, and by configuring said arrangement to control said first and second drive means to coordinate movement of the impact point of said jet member between said end positions calculated of the respective of said stripes and said indexing of the jet member so as to treat a surface of said layer having said geometrical shape by said jet member.

This configuration of a device of this type makes it possible to restrict treatment of a layer by said jet to only the surface to be treated irrespectively of the geometrical shape thereof without any need of changing the indexing direction of the device and going to and fro in several runs. This means that the treatment will be very costefficient. The improvement will be particularly considerable with respect to the different ways to proceed for removing material from a road surface on bridges having joints extending obliquely to the extension of the bridge described above.

Furthermore, the device according to the invention also enables creation of arbitrary new geometrical shapes of layer surfaces treated by the jet of the jet member.

It is pointed out that "means configured to enable input of data relating to a geometrical shape of a surface of said layer to be treated by the jet member" as well as "means configured to use said data for calculating end positions of said impact point of the jet member" are to be interpreted to also cover the case of having data for predetermined geometrical shapes and dimensions stored in a memory, so that a particular one of them may be chosen by only inputting a code or the like for providing the control arrangement with the data required for the proper operation thereof.

According to an embodiment of the invention the device comprises a member configured to sense the instantaneous position of said carriage and deliver information thereabout to said control arrangement for assisting this to determine that a said end position calculated has been reached by said impact point of the jet member. This means a simple and reliable way of obtaining the correct length of each said stripe of treatment for forming said geometrical shape together with other such stripes with varying lengths.

According to another embodiment of the invention the device further comprises means associated with said means for input of data and configured to displace said geometrical shape determined by said input of data. The presence of such a display makes it possible for an operator of the device to comfortably ensure that the correct geometrical shape and dimensions of the surface layer to be treated have been selected. It may also facilitate the input operation of the data.

According to another embodiment of the invention said arrangement is configured to control said second drive means to move the entire device in said indexing steps 10 mm-100 mm, 20 mm-50 mm or 25 mm-45 mm. These are suitable sizes of such indexing steps for obtaining efficient treatment of a continuous surface layer and obtaining such treatment of such a surface layer with any shape by adding consecutive said stripes to each other for obtaining this shape. It has turned out that an indexing step of 25 mm-45 mm, especially 30 mm-40 mm is suitable for the application of removing weakened concrete from a concrete layer by a high pressure jet of liquid.

According to another embodiment of the invention said jet member is pivotably connected to a base portion of said carriage, the device comprises third drive means configured to pivot said jet member with respect to said base portion for changing the attack angle of the jet upon said layer, and said arrangement is configured to control also said third drive means. It is known that the possibility of such pivoting has a number of advantages. One of the main reasons for pivoting said jet member for changing the attack angle is due to the fact that when treating concrete layers these are reinforced by reinforcement bars, normally in a lattice-like structure. By using a small attack angle, i.e. an angle of the jet being substantially perpendicular to the layer to be treated, the material may be removed quickly, but the result of the treatment will not be that uniform. However, by choosing a large attack angel of the jet the jet will easier reach under the reinforcement bars, so that it will be cleaner there-under and the result of the treatment will be more uniform and the surface treated smooth.

The pivoting of said jet member is normally carried out in the turning zones of said carriage, i.e. in the end and the beginning of said first substantially rectilinear path of the carriage close to the respective end position calculated, i.e. the turn point of the carriage, in which the carriage stops and changes direction. It is important to obtain a treatment of said layer being as uniform as possible also in these turning zones, where the attack angle is often changed and the speed and the direction of movement of said carriage is also changed. This is obtained through a further embodiment of the invention in which the control arrangement is configured to co-ordinate the control of said first and third drive means for moving said impact point of the jet with a substantially constant speed over said layer. By such a co-ordination of the control of the movement of the carriage and the pivoting movement of the jet member a uniform treatment of said layer may be obtained also during pivoting of said jet member, since it is ensured that the impact point will always move with a substantially constant speed over said layer. More details about how this may in practice be realised may be found in WO 2006/073337 A1 of the applicant, the teaching of which is included herein by reference.

According to another embodiment of the invention said jet member is movably connected to a base portion of said carriage so as to enable it to oscillate in a direction being transversal to said first path, and said arrangement is configured to control the jet member to carry out oscillations transversal to said first path while controlling the first drive means to move said carriage in said first path so as to determine said width of a said stripe of the layer treated. The possibility of carrying out such oscillations facilitates to reliably ensure that consecutive stripes of layer treated by the jet of the jet member will connect to each other and possibly overlap each other slightly.

The invention also provides a method for moving a jet member according to the independent appended method claim, and the function and advantageous features thereof and of embodiments thereof according to the appended dependent method claims appear clearly from the discussion above of the device according to the invention.

However, the particular embodiment of providing data in step a) relating to a geometrical shape in the form of a parallelogram having two first sides being substantially in parallel with said second path for indexing and two second sides making an angle being not zero with said first path, such as above 5°, above 10°, above 20° or above 30° and below 90° may be mentioned, since this is a particular preferred application of the invention when removing concrete material from for instance bridges.

According to an embodiment of the invention said data may then in step a) be provided as position co-ordinates of corners or said parallelogram, although of course also other data may be used for defining the surface layer parallelogram to be treated, such as said angle and the length of the sides thereof.

The method according to the present invention is well suited to be carried out by a computer program making a computer or processor controlling the steps of said method, and the invention also comprises such a computer program.

Furthermore, the invention also comprises the use of a device according to the present invention for material removing treatment of a material layer, especially a concrete layer.

Further advantages as well as advantageous features of the invention appear from the following description.

BRIEF DESCRIPTION OF THE DRAWINGS

With reference to the appended drawings, below follows a specific description of a device and a method according to an embodiment of the present invention.

In the drawings.

DETAILED DESCRIPTION OF AN EMBODIMENT OF THE INVENTION

Figure 1:
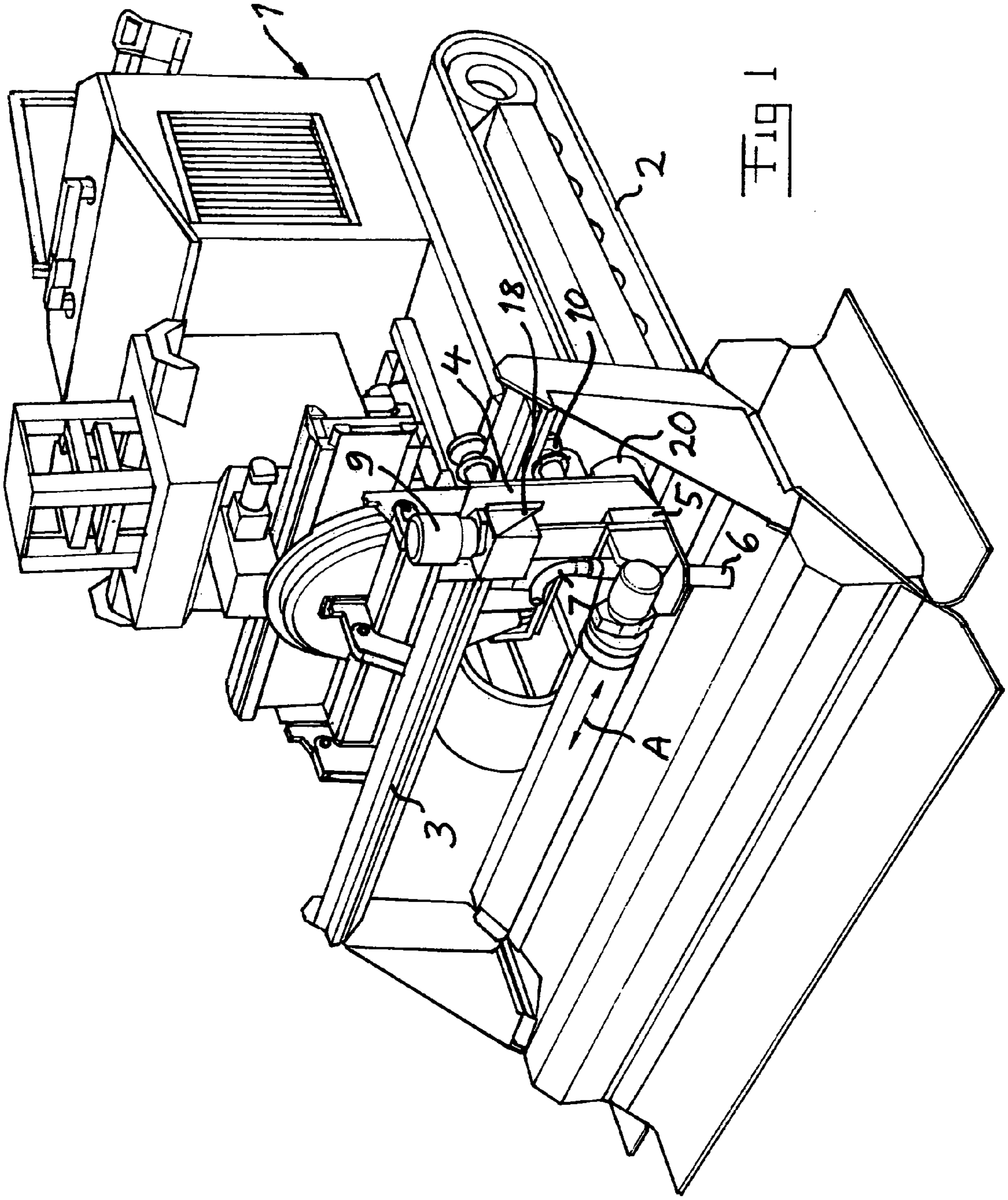
FIG. 1 is a schematic perspective view of a mobile unit, in which the device according to the invention is implemented.

The device according to the invention may, as illustrated in FIG. 1, be arranged on a mobile unit 1. This has the character of a vehicle movable on the bedding, for instance a concrete layer, to be treated. The vehicle is indicated as being of crawler type with two driving tracks 2.

On the vehicle 1 is arranged an elongated guide member 3 and a carriage 4 movable in first a substantially rectilinear path to and fro along said guide member for carrying out so called traverses. A base portion 5 constitutes a part of the carriage 4. A tube-type jet member 6 or lance is arranged on the base portion 5 for directing a high pressure jet of liquid against the bedding. The guide member 3 in operation is intended to make an angle, preferably substantially a right angle, with a motion direction of the vehicle. The jet member 6 communicates through a conduit 7 with a source for delivering high pressure liquid, especially water, to the jet member. This high pressure source may be arranged on the vehicle 1 or on a separate carriage or the like.

The jet member 6 is arranged pivotably in relation to the base portion 5 about an axis 8 (see simplified FIG. 2) for changing the attack angle of said jet upon the layer to be treated. This axis 8, in the example, is extending substantially transversally to the length direction of the guide member 3, and more exactly substantially in right angle to a plane, in which plane the guide member 3 is located and which plane extends perpendicularly to the material layer to be treated.

A first drive means in the form of an hydraulic motor 9 is arranged for moving said carriage along the guide member 3 as indicated by the arrows A, whereas a third drive means in the form of an hydraulic motor 10 is arranged for pivoting the jet member 6 with respect to the base portion for changing the attack angle of the jet upon the layer to be treated. Such pivoting is substantially carried out in the turning zones close to the respective end position of the carriage 4 along said rectilinear path. The location of these end positions may vary as will be described more in detail further below.

Figure 2:
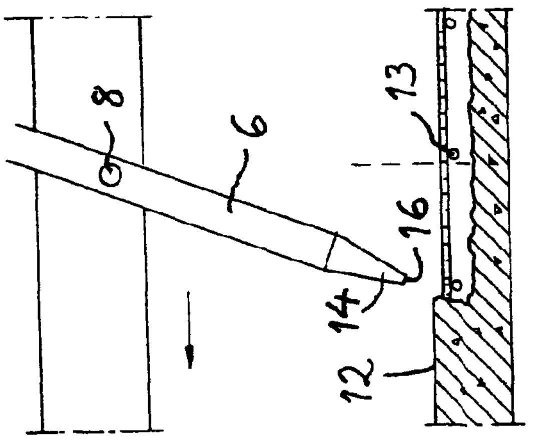
FIG. 2 is a schematic view of a jet member of a device according to the present invention, which is moving along a layer treated by the jet thereof and is viewed perpendicularly to a guide member, along which a carriage is movable.

Means, such as rubber rollers 11 are arranged to bear on the bedding and restricting a space within which said treatment is carried out for protecting the surroundings of the vehicle 1 against material removed by the jet of the jet member 6 and thrown away. It is shown in FIG. 2 how the jet member 6 is moving to the left in a transversal movement while removing material, here concrete, from the bedding 12. The concrete layer is reinforced by a lattice-like grid of reinforcement bars 13, and by keeping the jet member 6 inclined the jet will reach under these reinforcement bars. The choice of the inclination direction of the jet member is due to the required treatment result and the character of the material. In the case shown in FIG. 2 the nozzle 14 of the jet member points in the motion direction of the carriage, and it will do so also when the carriage has changed moving direction.

A control arrangement adapted for controlling the drive means 9, 10, for example a suitable computer, is adapted, when the carriage 4 has reached a turning zone close to an end position along the guide member 3, to control the drive means 10 to pivot the jet member 6 so that its nozzle during the motion of the carriage in both directions of motion will be pointing in these motion directions. The end positions of the carriage 4 may be defined by sensor members connected to the control arrangement. The hydraulic motor 9 may be controlled to the move the carriage 4 one or several times, i.e. in one or more traverses, to a fro between said end positions before said driving tracks 2 are controlled to move the entire vehicle and by that the carriage 4 with the jet member 6 a step forwards, so called indexing, for treating a new area of the layer to be treated. The jet member may also oscillate in a direction being transversal to the movement path of the carriage, but this oscillation has not to be considered when calculating the total speed of said impact point over said layer or when assuring that said mouth is moving in one and the same plane. Such oscillations results in a broader stripe of the layer surface treated by the jet when moving this along said first path.

Figure 4:
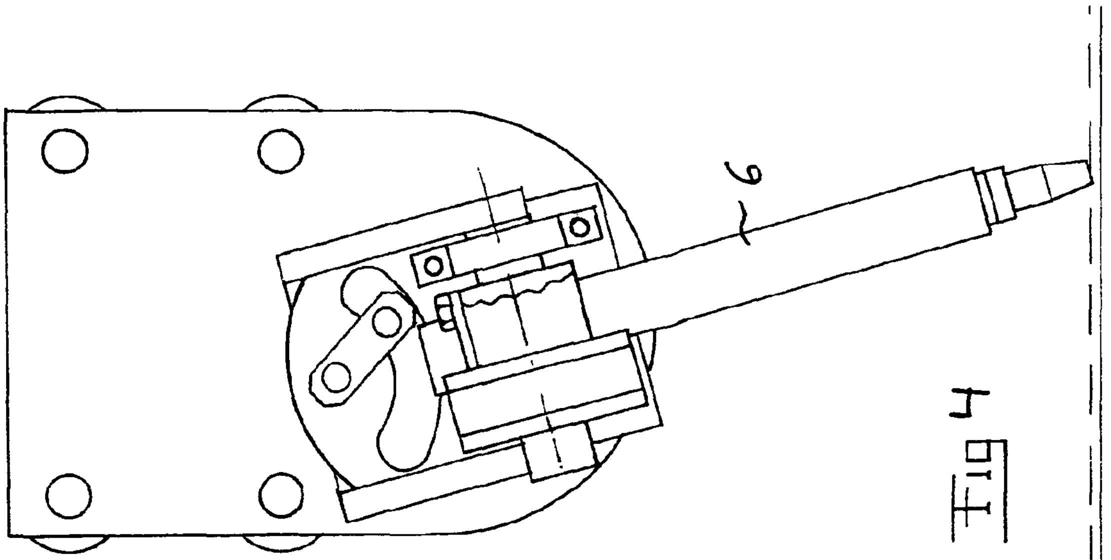
FIGS. 3 and 4 are more detailed views of the carriage with base portions of the device according to the present invention in different function positions.
Figure 3:
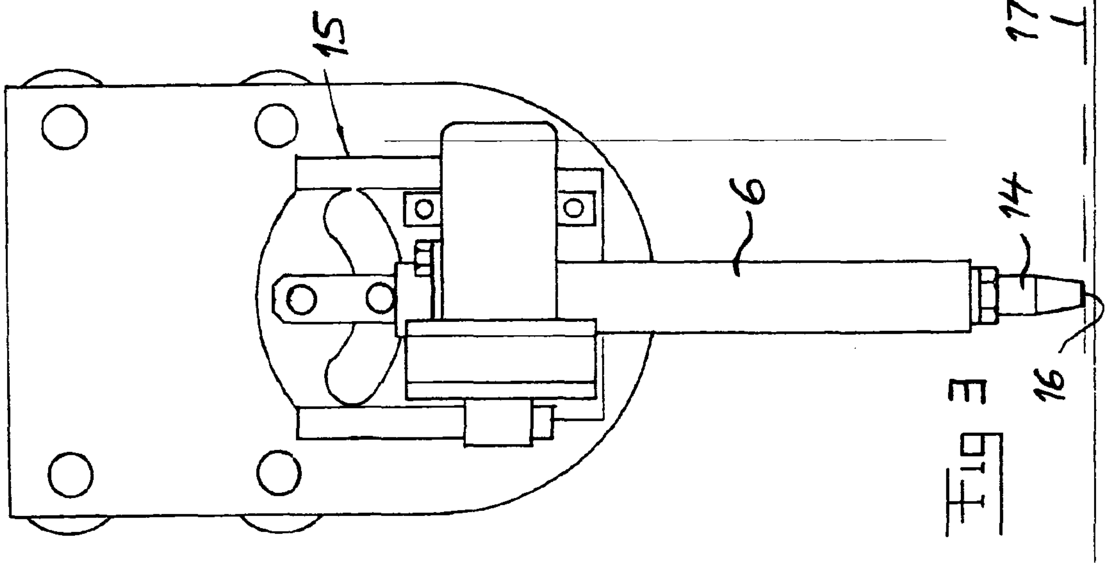

It is schematically illustrated in FIGS. 3 and 4 how guide means 15 are arranged to guide the jet member to have the pivot axis thereof displaced with respect to said base portion 5 of the carriage during pivoting of the jet member with respect to said base portion so that the mouth 16 of the nozzle of the jet member deecribes a motion in substantially one and the same plane 17 substantially perpendicular to the plane in which the jet member is pivoting. As seen, this plane 17, during operation is located directly above the layer 12 to be subjected to treatment. The construction of the guide means for obtaining this motion of said mouth 16 in the plane 17 may be the same as the one described in EP 1 029 127 B1 while making reference to FIG. 8-10, and it will not be disclosed more in detail here.

Figure 5:
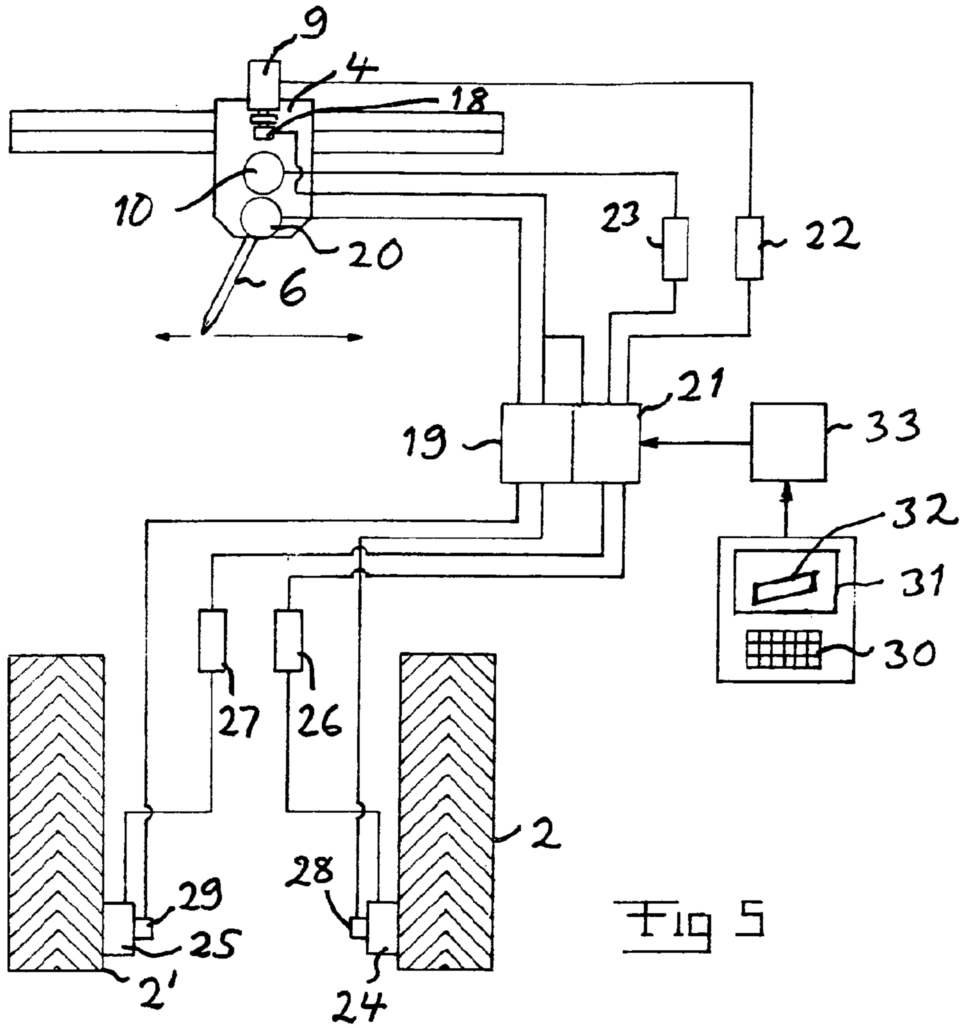
FIG. 5 is a very simplified view illustrating further features of a device according to an embodiment of the present invention.
Figure 6:
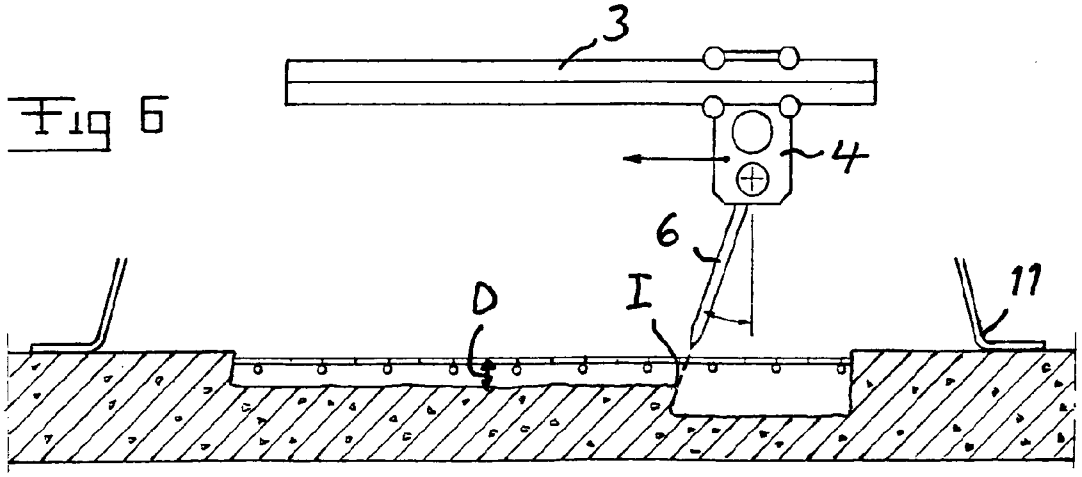
FIG. 6 is a simplified view similar to that according to FIG. 2 illustrating one aspect of the way of operation of a device according to the invention.

Reference is now made to FIGS. 5 and 6. The device comprises a member 18 adapted to sense the instantaneous position of the carriage 4 and deliver information thereabout to a calculator 19 as well as means 20 adapted to sense the instantaneous angle made by the longitudinal direction of the jet member 6 with respect to a predetermined direction thereof, such as the direction perpendicular to the layer to be treated, and send information thereabout to said calculator. The calculator 19 is adapted to calculate the total speed of the impact point of the jet over the layer to be treated through information from said first and second members. An arrangement 21 adapted to control the hydraulic motors 9, 10 include means adapted to compare the value of the total speed calculated by the calculating means with a predetermined set speed value for determining a difference value and to control the hydraulic motors 9, 10 by controlling hydraulic valves 22, 23 so as to cancel out said difference value, so that said impact point will move with a substantial constant speed over said layer. For being able to do this said control arrangement has to be aware of the distance between the pivot point of the jet member and the mouth of the nozzle thereof, which is known to the control arrangement when a basic jet member is moved over a portion of the layer not treated yet but otherwise has to be fed into the control unit 21 through a control terminal or the like by an operator. A new such distance value has to be fed into the control unit if the jet member is replaced by a jet member having a different length or the jet member is to be moved over a portion of the layer where material has already been removed to a certain depth as shown in FIG. 6. This depth D, which may for instance be about 50 mm, substantially corresponds to the change to a jet member having a length increasing by D with respect the jet member used in the first run or traverse.

It may in this way be ensured that the speed of the impact point I of the jet upon the layer to be treated is always constant and the same as a predetermined set speed. However, the carriage may very well be controlled to increase its speed in the turning zones rather much for making these turning zones shorter and by that the quality of the treatment at the turn points may be improved.

It is also shown in FIG. 5 how the driving tracks 2 are individually controlled by individual hydraulic motors 24, 25 by controlling hydraulic valves 26, 27 through said control arrangement 21 in accordance with signals delivered to said calculator through sensors 28, 29 arranged at each driving track for ensuring that the vehicle 1 is moved along a rectilinear or other determined path when indexing.

The device described so far is already known through WO 2006/073337 A1, and the new features of a device according to the present invention will now be described.

In the device according to the invention the hydraulic motor 24, 25 forming second drive means are configured to move the entire device and by that said guide member in a second substantially rectilinear path being substantially perpendicular to the extension of said guide member when indexing, although other way of moving the device may be possible but not used for carrying out a method according to the present invention. The device according to the invention further comprises means 30, here in the form of a keyboard, configured to enable input of data relating to a geometrical shape of a surface of said layer to be treated by the jet member. These means 30 may have any conceivable construction, such as being an encoder in the form of a knob that may be turned for obtaining different data of said shape, which are then validated by pushing a button in the respective position of the knob associated with a specific piece of information. Means 31 in the form of a screen are associated with the means 30 for input of data and configured to display said geometrical shape 32 determined by the input of data. These data are sent further to means 33 configured to use said data for calculating end positions of the impact point of the jet member for a plurality of consecutive stripes extending substantially perpendicularly to said second path for indexing, each having a width substantially corresponding to said indexing step and together forming said geometrical shape. The calculating means 33 is configured to send the result of the calculation further to the control arrangement 21.

The control arrangement 21 is configured to control the first drive means 9 and the second drive means 24, 25, and here in the case of third drive means 20 also this, to co-ordinate movement of the impact point of the jet member between said end positions calculated by the calculating means 33 of the respective of said stripes and said indexing of the jet member so as to treat a surface of said layer having said geometrical shape by said jet member. Information from the member 18 for sensing the instantaneous position of the carriage 4 will also be used for assisting the control arrangement to determine that a said end position calculated has been reached is shown in FIG. 5.

This results in a possibility to obtain treatment of a continuous surface of a layer to be treated having any geometrical shape by in this way adding layer stripes treated with varying lengths for forming the geometrical shape aimed at. Although it should from the above be clear how this is done, it will now be further explained while making reference to also FIGS. 7-9.

Figure 7:
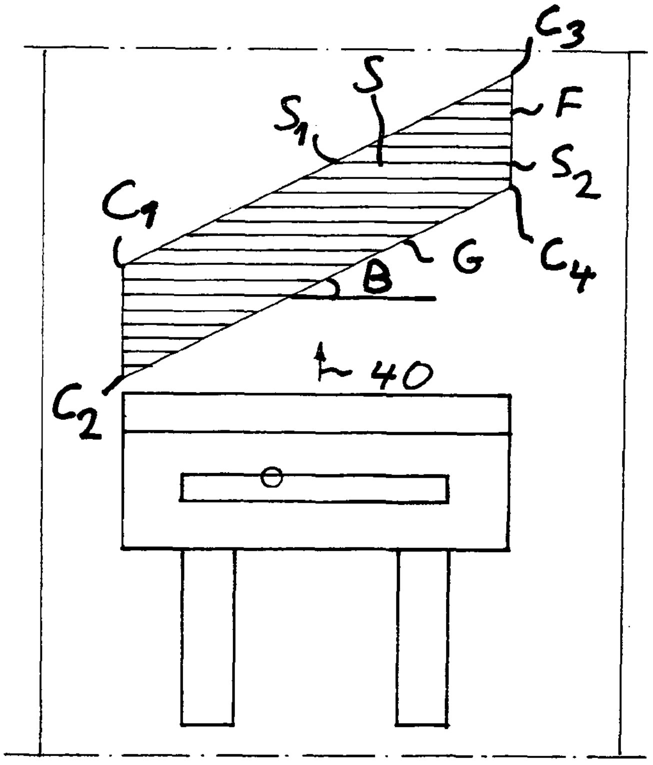
FIGS. 7-9 are very simplified views used for explaining a method according to the invention and the operation of a device according to the invention.

We do now assume that a surface with a geometrical shape in the form of a parallelogram is to be treated by the jet of the jet member as may be the case for a bridge joint extending obliquely to the extension of the bridge, such as making an angle of 60° with respect thereto, as shown in FIG. 7. This is then obtained by providing data relating to this geometrical shape of the surface by using the keyboard 30. This data may for instance include position co-ordinates of a point on said parallelogram, such as a corner $C_1$ thereof, the length of a first side F of the parallelogram, the angle B may by a second side G thereof with said first substantially rectilinear path corresponding to the extension of the guide member of the device and the length of a said second side or the component of said second side in the direction of said first path. Other data, such as the co-ordinates of the different corners $C_1$, $C_2$, $C_3$ and $C_4$ of the parallelogram may also or instead be entered. The calculating means 33 do then use this data for calculating end positions of said impact point of the jet member for a plurality of consecutive stripes extending substantially perpendicularly to said second path for indexing, each having a width substantially corresponding to said indexing step and together forming said geometrical shape. Each indexing step is here only 30-40 mm, and it would therefore not be possible to draw these stripes at scale in the figures, but such stripes are here only schematically illustrated by a line S extending between two end positions $S_1$ and $S_2$. Thus, these stripes are also more to the number and arranged at a higher density than shown in FIG. 7.

The control arrangement 21 will then control said first 9 and second 24, 25 drive means to co-ordinate movement of the impact point of the jet member between the end positions calculated of the respective of said stripes S and said indexing of the jet member so as to treat the surface of said parallelogram, as shown in FIG. 7.

Figure 8:
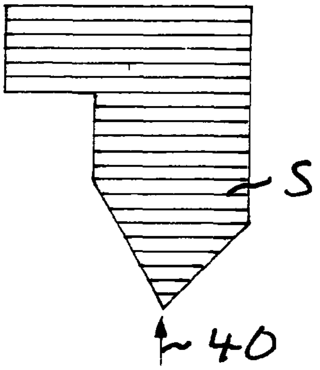
Figure 9:
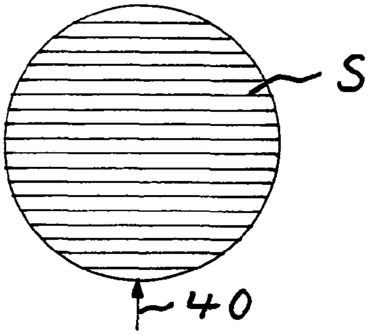

It is illustrated in FIGS. 8 and 9 how treatment of surfaces of quite other geometrical shapes may be carried out by a device according to the invention by adding stripes S of surface treated by the jet member with different locations of opposite end positions thereof to each other for obtaining the shape aimed at. For obtaining a treatment of a circular surface of a layer, as shown in FIG. 9, it will be suitable to provide data in the form of the co-ordinates of the centre of the circle and the diameter thereof. The indexing direction corresponding to a movement in said second substantially rectilinear path is indicated by an arrow 40 in FIG. 7-9. It is pointed out that the indexing may of course take place in the opposite direction.

The invention is of course not in any way restricted to the embodiment described above, but many possibilities to modifications thereof would be apparent to a person with ordinary skill in the art without departing from the scope of the invention as defined in the appended claims.

It is pointed out that the invention is not at all restricted to a device or a method in which the impact point of a jet member is moved with a constant speed on the layer treated. Neither is the invention restricted to devices in which it is possible to change the attack angle of the jet or doing this by keeping the distance between the nozzle of the jet member and the material layer to be treated substantially constant.

It is also within the scope of the invention to form shapes of surfaces treated being constituted of several surface shapes combined. An individual surface shape of such a combination may then be obtained while indexing in a different direction than for another/other surface shape(s).

The surface layer to be treated may have any orientation and may for instance have a vertical extension, such as being a part of a wall of a building or a pier of a bridge.

The input of data relating to a geometrical shape may also take place by moving the jet member to point on different points of the surface to be treated, such as the corners of a parallelogram, and then confirm and store the co-ordinates of these points by for instance pushing a button.

The invention claimed is:

1. A device for moving a jet member (6) having a nozzle (14), said device comprising a carriage (4) movable in a first substantially rectilinear path along a guide member (3), first drive means (9) configured to move said carriage along said guide member for moving the nozzle of the jet member in said first path over a layer to be treated by the jet, second drive means (24, 25) configured to move the entire device and by that said guide member in a second substantially rectilinear path being substantially perpendicular to the extension of said guide member, and an arrangement (21) configured to control on one hand said first drive means for controlling the movement of the impact point of said jet on said layer and on the other hand said second drive means for moving the jet member to move said impact point on said layer an indexing step in said second path when moved at least once between end positions on said first path, wherein the device further comprises means (30) configured to enable input of data relating to a geometrical shape of a surface of said layer to be treated by the jet member, and means (33) configured to use said data for calculating end positions ($S_1$, $S_2$) of said impact point of the jet member for a plurality of consecutive stripes (S) extending substantially perpendicularly to said second path for indexing, each having a width substantially corresponding to said indexing step and together forming said geometrical shape, and said arrangement (21) is configured to control said first and second drive means (9; 24, 25) to coordinate movement of the impact point of said jet member between said end positions calculated of the respective of said stripes and said indexing of the jet member to treat a surface of said layer having said geometrical shape by said jet member.

2. A device according to claim 1, wherein it comprises a member (18) configured to sense the instantaneous position of said carriage (4) and deliver information thereabout to said control arrangement (21) for assisting this to determine that an end position calculated has been reached by said impact point of the jet member (6).

3. A device according to claim 1, wherein the device further comprises means (31) associated with said means for input of data and configured to display said geometrical shape determined by said input of data.

4. A device according to claim 1, wherein said arrangement (21) is configured to control said second drive means to move the entire device in said indexing steps 10 mm-100 mm, 20 mm-50 mm or 25 mm-45 mm.

5. A device according to claim 1, wherein said jet member (6) is pivotably connected to a base portion (5) of said carriage (4), the device comprises third drive means (10) configured to pivot said jet member with respect to said base portion for changing the attack angle of the jet upon said layer, and said arrangement (21) is configured to control also said third drive means.

6. A device according to claim 5, wherein said arrangement (21) is configured to co-ordinate the control of said first (9) and third (10) drive means for moving said impact point of the jet with a substantially constant speed over said layer.

7. A device according to claim 1, wherein said jet member (6) is movably connected to a base portion (5) of said carriage (4) to enable it to oscillate in a direction being transversal to said first path, and said arrangement (21) is configured to control the jet member (6) to carry out oscillations transversal to said first path while controlling the first drive means (9) to move said carriage in said first path to determine said width of said stripe (S) of the layer treated.

8. A method for moving a jet member (6) having a nozzle (14), said jet member being arranged on a carriage (4) movable in a first substantially rectilinear path along a guide member (3), in which said carriage is moved for moving the nozzle of the jet member in said first path over a layer to be treated by the jet, and when the impact point of the jet member has been moved at least once between opposite end positions on said first path the guide member (3) and by that the carriage (4) is moved an indexing step in a second substantially rectilinear path being substantially perpendicular to the extension of said guide member, wherein it comprises the further steps of:

a) providing data relating to a geometrical shape of a surface of said layer to be treated by the jet member, b) calculating, on the basis of said data, end positions ($S_1$, $S_2$) of said impact point of the jet member (6) for a plurality of consecutive stripes (S) extending substantially perpendicularly to said second path for indexing, each having a width substantially corresponding to said indexing step and together forming said geometrical shape, and c) co-ordinating movement of the impact point of said jet member between said end positions calculated of the respective of said stripes and said indexing of the jet member to treat a surface of said layer having said geometrical shape by said jet member.

9. A method according to claim 8, wherein the carriage (4) is moved an indexing step of 10 mm-100 mm, 20 mm-50 mm or 25 mm-45 mm when indexing in step c).

10. A method according to claim 8, wherein data relating to a geometrical shape in the form of a parallelogram having two first sides (F) being substantially in parallel with said second path for indexing and two second sides (G) making an angle (B) being not zero with said first path, such as above 5°, above 10°, above 20° or above 30° and below 90°, are provided in step a).

11. A method according to claim 10, wherein said data is in step a) provided as position co-ordinates of corners ($C_1$, $C_2$, $C_3$, $C_4$) of said parallelogram.

12. A method according to claim 8, wherein said jet member (6) is in step c) pivoted with respect to said carriage (4) for changing the attack angle of the jet upon said layer.

13. A method according to claim 12, wherein said pivoting of the jet member (6) and the movement of said carriage (4) are co-ordinated for moving said impact point of the jet with a substantially constant speed over said layer.

14. A method according to claim 8, wherein the jet member (6) is controlled to carry out oscillations transversally to said first path while moving said carriage (4) in said first path to determine said width of said stripe of the layer treated.

15. A use of a device according to claim 1 for material removing treatment of a material layer, especially a concrete layer.

16. A computer program containing computer program code means for making a computer or processor controlling the steps of the method according to claim 8.

17. A device according to claim 2, wherein the device further comprises means (31) associated with said means for input of data and configured to display said geometrical shape determined by said input of data.

18. A device according to claim 17, wherein said arrangement (21) is configured to control said second drive means to move the entire device in said indexing steps 10 mm-100 mm, 20 mm-50 mm or 25 mm-45 mm.

19. A device according to claim 2, wherein said arrangement (21) is configured to control said second drive means to move the entire device in said indexing steps 10 mm-100 mm, 20 mm-50 mm or 25 mm-45 mm.

20. A device according to claim 3, wherein said arrangement (21) is configured to control said second drive means to move the entire device in said indexing steps 10 mm-100 mm, 20 mm-50 mm or 25 mm-45 mm.

* * * * *